US012643694B1

(12) United States Patent
Hall et al.

(10) Patent No.: US 12,643,694 B1
(45) Date of Patent: Jun. 2, 2026

(54) DYNAMIC PRESSURE CHAMBER ELECTRICAL PASSTHROUGH

(71) Applicant: BAE Systems Information and Electronic Systems Integration Inc., Nashua, NH (US)

(72) Inventors: Matthew M. Hall, Nashua, NH (US); Ross J. Wendell, Medford, MA (US); Elizabeth A. Deloia, Westford, MA (US); Jack T. Nigro, Nashua, NH (US); Sye Hoon Noh, Austin, TX (US); Bernard A. Sacco, Jr., Westford, MA (US); Connor Feathers, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 159 days.

(21) Appl. No.: 18/885,164

(22) Filed: Sep. 13, 2024

(51) Int. Cl.
*B64U 70/50* (2023.01)
*H02G 3/02* (2006.01)

(52) U.S. Cl.
CPC .............. *B64U 70/50* (2023.01); *H02G 3/02* (2013.01)

(58) Field of Classification Search
CPC ............. B64U 70/50; H02G 3/02; B64D 7/08
See application file for complete search history.

(56) References Cited

U.S. PATENT DOCUMENTS

| | | | | |
|---|---|---|---|---|
| 3,974,774 A | * | 8/1976 | Schaffner ............... | F41F 3/077 |
| | | | | 89/1.816 |
| 6,443,391 B1 | | 9/2002 | Malejko et al. | |
| 11,624,594 B1 | * | 4/2023 | Neal, III ................ | F42B 10/64 |
| | | | | 244/3.27 |
| 12,510,336 B1 | * | 12/2025 | Alix .......................... | F42B 5/15 |
| 2012/0068002 A1 | * | 3/2012 | Unger .................... | F42B 10/64 |
| | | | | 244/3.28 |
| 2018/0244402 A1 | * | 8/2018 | Kahlon ................. | B64U 70/50 |
| 2020/0247540 A1 | * | 8/2020 | Jones ....................... | B64D 7/08 |
| 2025/0296701 A1 | * | 9/2025 | Hall .......................... | B64F 1/04 |

FOREIGN PATENT DOCUMENTS

| | | | | | |
|---|---|---|---|---|---|
| AU | 2024322648 A1 | * | 3/2026 | | |
| EP | 2433084 B1 | * | 5/2013 | ............. | F42B 10/64 |
| WO | WO-2024003902 A1 | * | 1/2024 | ............. | F42B 10/14 |
| WO | WO-2025151151 A2 | * | 7/2025 | ............. | F42B 12/40 |

* cited by examiner

*Primary Examiner* — Christopher P Ellis

(74) *Attorney, Agent, or Firm* — Sand, Sebolt & Wernow LPA

(57) ABSTRACT

A signal passthrough kit operably engaged with a canister housing an air vehicle and an electronic assembly. The signal passthrough kit includes a backer plate that operably engages with the canister. The signal passthrough kit also includes a piston that operably engages with the canister, the backer plate, and the air vehicle, wherein the piston is positioned between the backer plate and the air vehicle. The signal passthrough kit also includes a circuit card assembly that operably engages with the backer plate and is positioned external to a canister chamber defined by the canister. The signal passthrough kit is configured to output at least one signal to the electronic assembly external to a pressure chamber defined in the air vehicle.

20 Claims, 10 Drawing Sheets

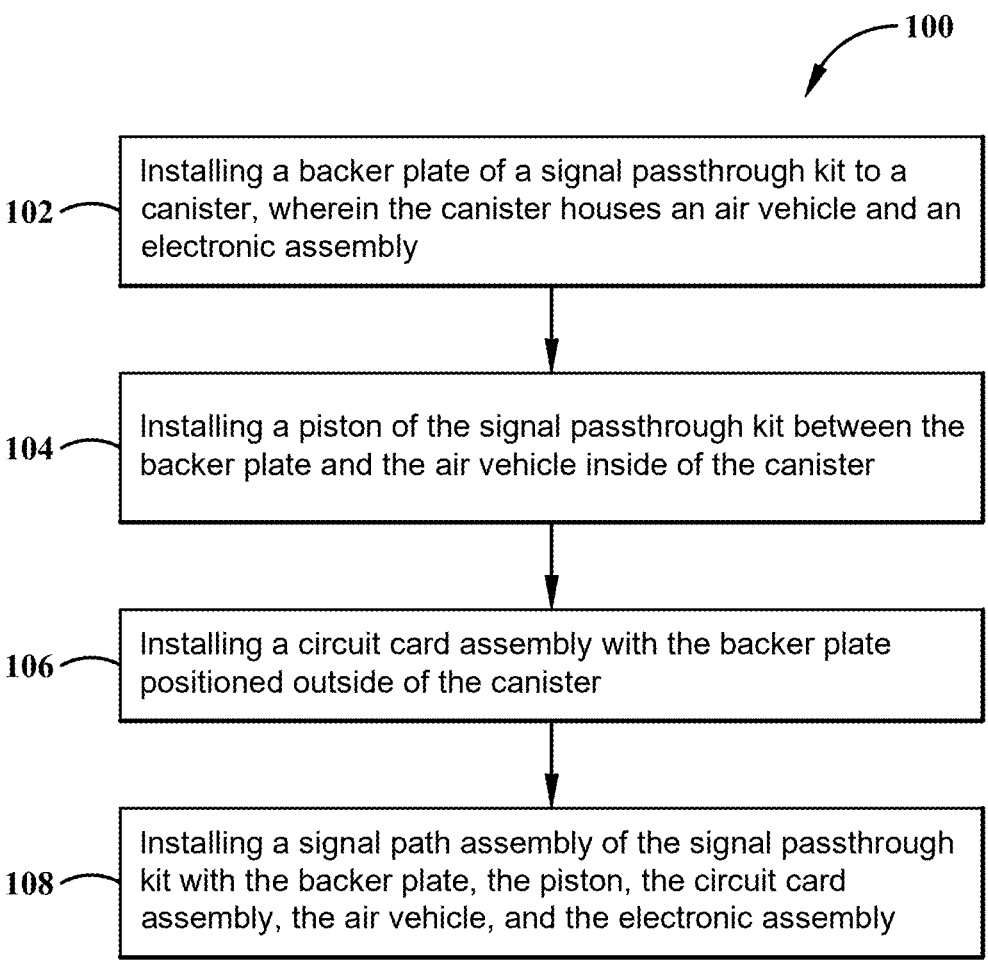

100

102 — Installing a backer plate of a signal passthrough kit to a canister, wherein the canister houses an air vehicle and an electronic assembly 104 — Installing a piston of the signal passthrough kit between the backer plate and the air vehicle inside of the canister 106 — Installing a circuit card assembly with the backer plate positioned outside of the canister 108 — Installing a signal path assembly of the signal passthrough kit with the backer plate, the piston, the circuit card assembly, the air vehicle, and the electronic assembly

FIG.9

DYNAMIC PRESSURE CHAMBER ELECTRICAL PASSTHROUGH

STATEMENT OF GOVERNMENT INTEREST

This invention was made with government support under contract number 21 C8099 awarded by a classified United States federal agency. The government has certain rights in the invention.

TECHNICAL FIELD

The present disclosure is generally related to a signal passthrough system for transmitting external electrical signals remote from a dynamic pressure chamber of a payload system.

BACKGROUND ART

In military operations, various types of military platforms launch and/or eject projectiles or vehicles for both offensive capabilities and defensive capabilities depending on the issue at hand. In one example, air vehicles and similar airborne platforms may eject payloads or vehicles in flight to attack an enemy target or to defend itself from incoming threats from an enemy target. Some of these payloads or vehicles may be installed with on-board electronics to assist the air vehicle when in flight for guidance purposes, detonation purposes, and other purposes that may be useful in various military operations. With such electronic capabilities, outside or external systems of the platform may be used to communicate with the on-board electronics prior to operating the platform in a military environment and when operating the platform in a military environment.

However, such routing of electrical systems and wiring inside of these air vehicles or projectiles may result in various issues that may be detrimental to the function of using said air vehicles or projectiles. In one example, the operation of ejecting the air vehicle or projectile may be compromised due to the placement of wire and other electrical elements in certain ejection areas. As such, the communication capability between external systems of the platform and the onboard electronics of the projectile or air vehicle may require structural alterations to the projectile or air vehicle which may compromise the aerodynamic of the projectile or air vehicle, the number of projectiles or air vehicles that may be loaded into a platform, the overall weight of the projectile or air vehicle, and other similar compromises that may reduce the overall military capabilities of the projectile or air vehicle.

SUMMARY OF THE INVENTION

In the present disclosure, a signal passthrough system is integrated into an air vehicle and a canister that houses the air vehicle without disturbing or interrupting a pressure chamber used for ejecting the air vehicle from the canister. Particularly, the signal passthrough system enables one or more signals to be transmitted outside of a pressure chamber from an external dispensing system to electronics of the air vehicle. The signal passthrough system includes a backer plate, a piston, and a circuit card assembly that are positioned behind the air vehicle and inside of the canister to transmit external signals from the dispenser assembly into the canister. The signal passthrough system also includes a set of tail fin contacts, a set of jumper connections, and a flex circuit that are positioned along the exterior surface of the air vehicle that is remote from the pressure chamber and/or a sealed chamber of the air vehicle.

In one aspect, an exemplary embodiment of the present disclosure may provide a system. The system includes a canister having a first end, a second end longitudinally opposite to the first end, and a canister chamber defined between the first end and the second end; an air vehicle loaded into the canister chamber of the canister and defining a pressure chamber housing an environmentally sealed payload; an electronic assembly of the air vehicle housed inside of the air vehicle outside of the pressure chamber; and a signal passthrough system operably engaged with the canister, the air vehicle, and the electronic assembly; wherein the signal passthrough system is configured to output at least one signal to the electronic assembly external to and remote from the pressure chamber.

This exemplary embodiment or another exemplary embodiment may further include that the signal passthrough system is positioned external to the pressure chamber. This exemplary embodiment or another exemplary embodiment may further include that the signal passthrough system comprises: a backer plate operably engaged with the canister at the second end; a piston operably engaged with the canister, the backer plate, and the air vehicle, wherein the piston is positioned between the backer plate and the air vehicle; and a circuit card assembly operably engaged with the backer plate and positioned external to the canister chamber. This exemplary embodiment or another exemplary embodiment may further include that the signal passthrough system further comprises: a signal path system operably engaged with the backer plate, the piston, the circuit card assembly, and the air vehicle; wherein the signal path system is configured to output the at least one signal to the electronic assembly through the backer plate, the piston, and the air vehicle external to the pressure chamber. This exemplary embodiment or another exemplary embodiment may further include that the signal path system comprises: a set of electrical connections operably engaged with the circuit card assembly; a set of jumper connections operably engaged with the set of electrical connections; a flex circuit disposed about the air vehicle and connecting with the set of jumper connections; and a header operably engaged with the flex circuit and the electronic assembly of the air vehicle. This exemplary embodiment or another exemplary embodiment may further include that the air vehicle further comprises: a body having a first end, a second end longitudinally opposite to the first end, and defining a side aperture at a location between the first end and the second end; and a set of wing assemblies operably engaged with the body at the second end, wherein each wing assembly of the set of wing assemblies has a base defining a channel therein; wherein each jumper connection of the set of jumper connections is disposed in a respective wing assembly of the set of wing assemblies remote from the pressure chamber. This exemplary embodiment or another exemplary embodiment may further include that the signal path system further comprises: a set of piston plungers operably engaged with the piston; wherein the set of piston plungers interconnects the set of electrical connections and the set of jumper connections with one another. This exemplary embodiment or another exemplary embodiment may further include that each piston plunger of the set of piston plungers comprises: an input terminal positioned inside of the backer plate and the piston and operably engages with an electrical connection of the set of electrical connections; and an output terminal positioned inside of a cavity defined in the air vehicle and operably engages with a jumper connection of the set of jumper connections. This exemplary embodiment or another exemplary embodiment may further include that the set of electrical connections further comprise: a pair of control connections operably engaged with the backer plate and the circuit card assembly; and a pair of status connections operably engaged with the backer plate. This exemplary embodiment or another exemplary embodiment may further include that the signal path system further comprises: a pair of circuit card plunger operably engaged with the circuit card assembly; wherein each circuit card plunger of the pair of circuit card plunger interconnects a dispenser terminal of the circuit card assembly with a control connection of the pair of control connections.

In another aspect, an exemplary embodiment of the present disclosure may provide a signal passthrough kit operably engaged with a canister housing an air vehicle and an electronic assembly. The signal passthrough kit includes: a backer plate operably engaged with the canister; a piston operably engaged with the canister, the backer plate, and the air vehicle, wherein the piston is positioned between the backer plate and the air vehicle; and a circuit card assembly operably engaged with the backer plate and positioned external to a canister chamber defined by the canister; wherein the signal passthrough kit is configured to output at least one signal to the electronic assembly external to a pressure chamber defined in the air vehicle.

This exemplary embodiment or another exemplary embodiment may further include that the signal passthrough kit further comprises: a signal path system operably engaged with the backer plate, the piston, the circuit card assembly, and the air vehicle; wherein the signal path system is configured to output at least one signal to the electronic assembly through the backer plate, the piston, and the air vehicle external to the pressure chamber. This exemplary embodiment or another exemplary embodiment may further include that the signal path system comprises: a set of electrical connections operably engaged with the circuit card assembly; a set of jumper connections operably engaged with the set of electrical connections; a flex circuit disposed about the air vehicle and connecting with the set of jumper connections; and a header operably engaged with the flex circuit and the electronic assembly of the air vehicle. This exemplary embodiment or another exemplary embodiment may further include that the air vehicle further comprises: a body having a first end, a second end longitudinally opposite to the first end, and defining a side aperture at a location between the first end and the second end; and a set of wing assemblies operably engaged with the body at the second end, wherein each wing assembly of the set of wing assemblies has a base defining a channel therein; wherein each jumper connection of the set of jumper connections is disposed in a respective wing assembly of the set of wing assemblies remote from the pressure chamber. This exemplary embodiment or another exemplary embodiment may further include that the signal path system further comprises: a set of piston plungers operably engaged with the piston; wherein the set of piston plungers interconnects the set of electrical connections and the set of jumper connections with one another. This exemplary embodiment or another exemplary embodiment may further include that the set of electrical connections further comprise: a pair of control connections operably engaged with the backer plate and the circuit card assembly; and a pair of status connections operably engaged with the backer plate. This exemplary embodiment or another exemplary embodiment may further include that the signal path system further comprises: a pair of circuit card plunger operably engaged with the circuit card assembly; wherein each circuit card plunger of the pair of circuit card plunger interconnects a dispenser terminal of the circuit card assembly with a control connection of the pair of control connections.

In yet another aspect, an exemplary embodiment of the present disclosure may provide a method. The method includes steps of: installing a backer plate of a signal passthrough kit to a canister, wherein the canister houses an air vehicle and an electronic assembly; installing a piston of the signal passthrough kit between the backer plate and the air vehicle inside of the canister; installing a circuit card assembly with the backer plate positioned outside of the canister; and installing a signal path assembly of the signal passthrough kit with the backer plate, the piston, the circuit card assembly, the air vehicle, and the electronic assembly; wherein the signal path assembly is configured to output at least one signal to the electronic assembly external to a pressure chamber defined in the air vehicle.

This exemplary embodiment or another exemplary embodiment may further include that the step of installing the signal path assembly further comprises: installing a set of electrical connections of the signal path assembly with the circuit card assembly and the backer plate; installing a set of jumper connections of the signal path assembly with the set of electrical connections; installing a flex circuit with the set of jumper connections and with the air vehicle, wherein the flex circuit is disposed about an outer surface of a body of the air vehicle; and connecting the flex circuit and the electronic assembly of the air vehicle with a header of the signal path assembly. This exemplary embodiment or another exemplary embodiment may further include that the step of installing the set of jumper connections of the signal path assembly further includes that each jumper connection of the set of jumper connections passes through a channel defined in the body and in a respective wing assembly of a set of wing assemblies of the air vehicle remote from the pressure chamber.

BRIEF DESCRIPTION OF THE DRAWINGS

Sample embodiments of the present disclosure are set forth in the following description, are shown in the drawings and are particularly and distinctly pointed out and set forth in the appended claims.

FIG. 9 (FIG. 9) is a diagrammatic flowchart of an exemplary method.

Similar numbers refer to similar parts throughout the drawings.

DETAILED DESCRIPTION

Figure 1:
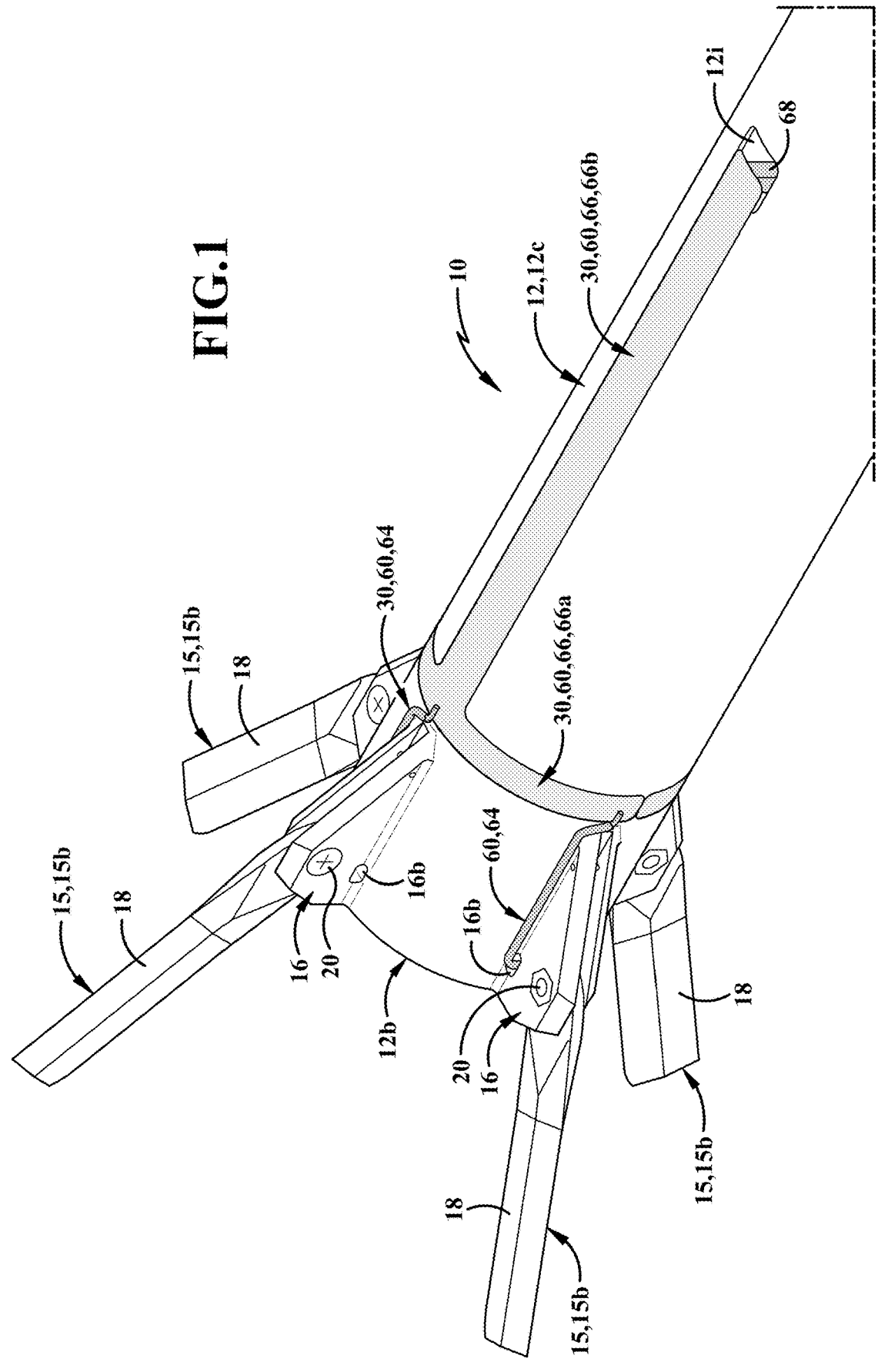
FIG. 1 (FIG. 1) is a partial top, front perspective view of the air vehicle that is equipped with a signal passthrough system.
Figure 2:
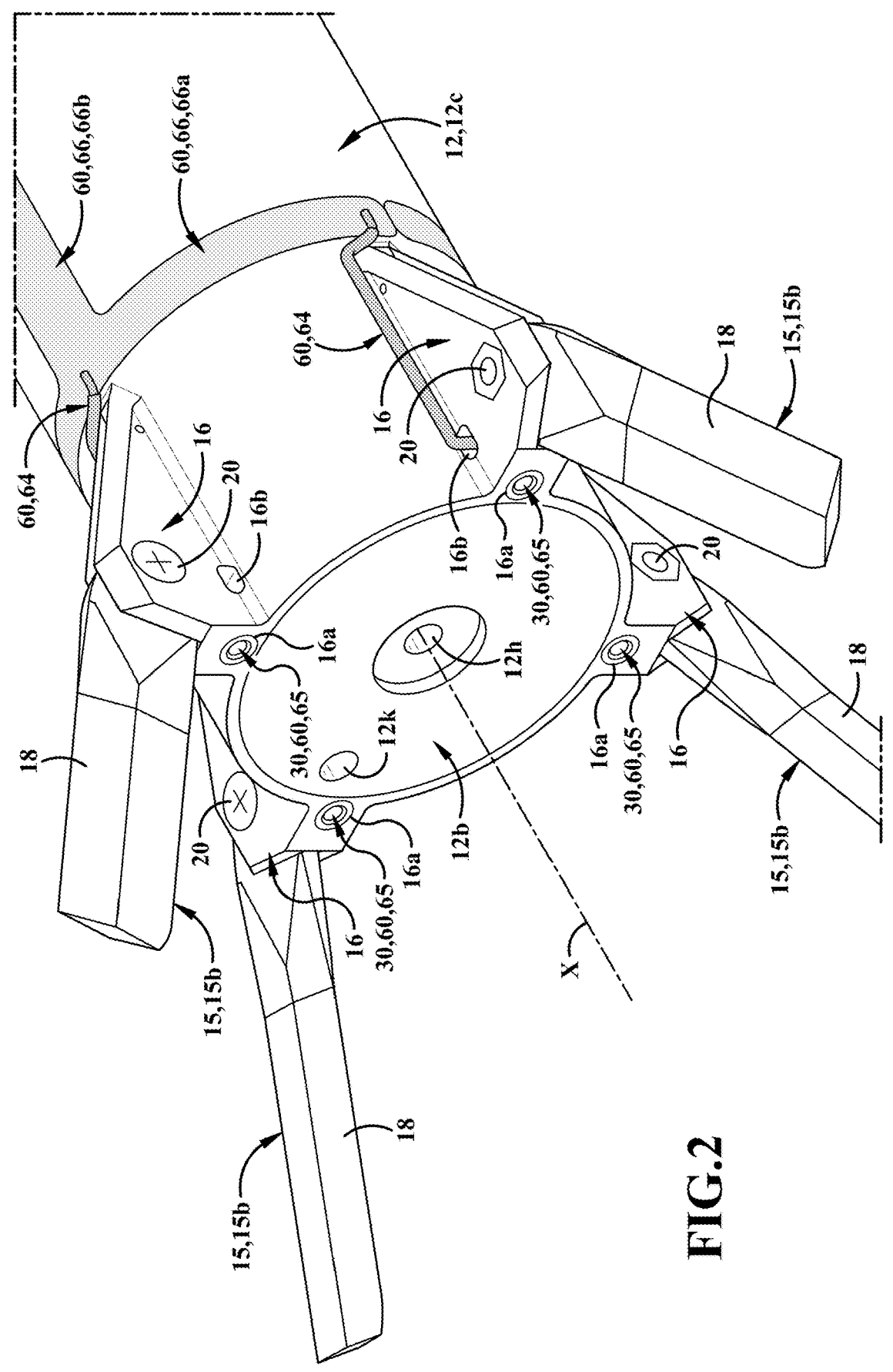
FIG. 2 (FIG. 2) is a partial top, rear perspective view of the air vehicle shown in FIG. 1.

FIGS. 1-2 illustrate an air vehicle 10 that may be launched or ejected from a payload system 2 that is housed on a platform or air vehicle. It should be understood that the payload system 2 is logically powered and controlled by an on-board system of the platform. The system may include suitable devices and apparatuses that are operably engaged with one another to logically control and power payload systems (such as payload system 2) described and illustrated herein. In the illustrated embodiments, payload systems described and illustrated herein may be logically powered and controlled by a legacy on-board system retaining a majority of legacy devices and apparatuses that are operably engaged with and in communication with one another. Examples of legacy devices and apparatuses that may be provided in this system include, but not limited to, a cockpit interface, discrete components, serial buses, a programmer, and data links. In another instance, a payload system described and illustrated herein may be logically powered and controlled by a new on-board system having new devices and apparatuses that are operably engaged with one another.

Figure 8:
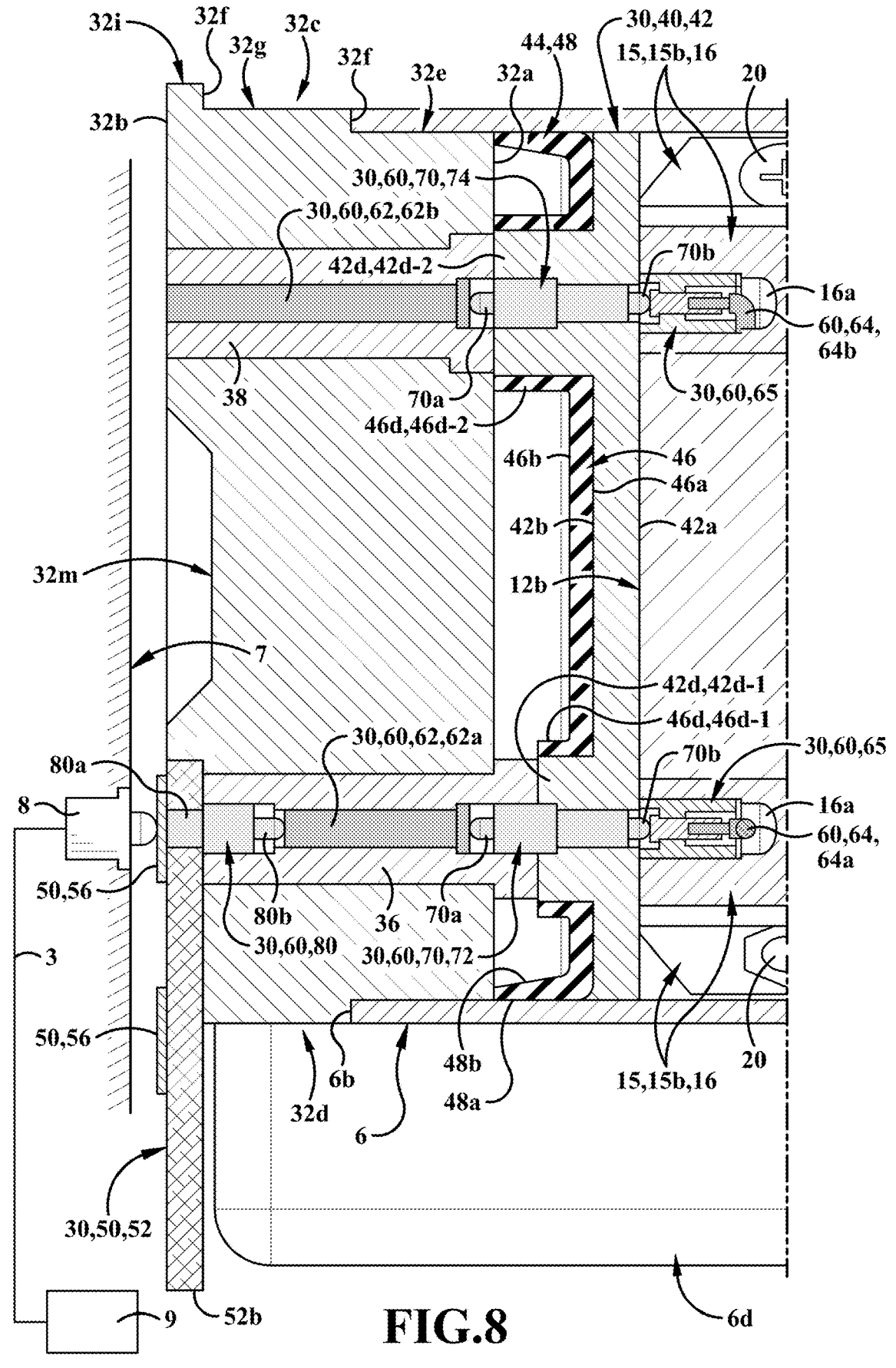
FIG. 8 (FIG. 8) is a sectional view taken in the direction of line 8-8 shown in FIG. 4.

Payload system 2 includes a dispenser assembly 4 that operably engages with the platform inside of said platform. As best seen in FIG. 8, dispenser assembly 4 is configured to hold various assemblies, components, and parts of payload system 2 inside of the platform for military operations, which are described in greater detail below. While not illustrated herein, connectors or fasteners may operably engage the dispenser assembly 4 with the platform for maintaining the payload system 2 with the platform; such engagement of the dispenser assembly 4 with the platform may be conventional means currently used in the art. In other exemplary embodiments, connectors described previously may be any suitable components that are configured to operably engage a dispenser assembly with a platform for maintaining a payload system with the platform (e.g., fasteners and other similar components of the like).

Figure 3:
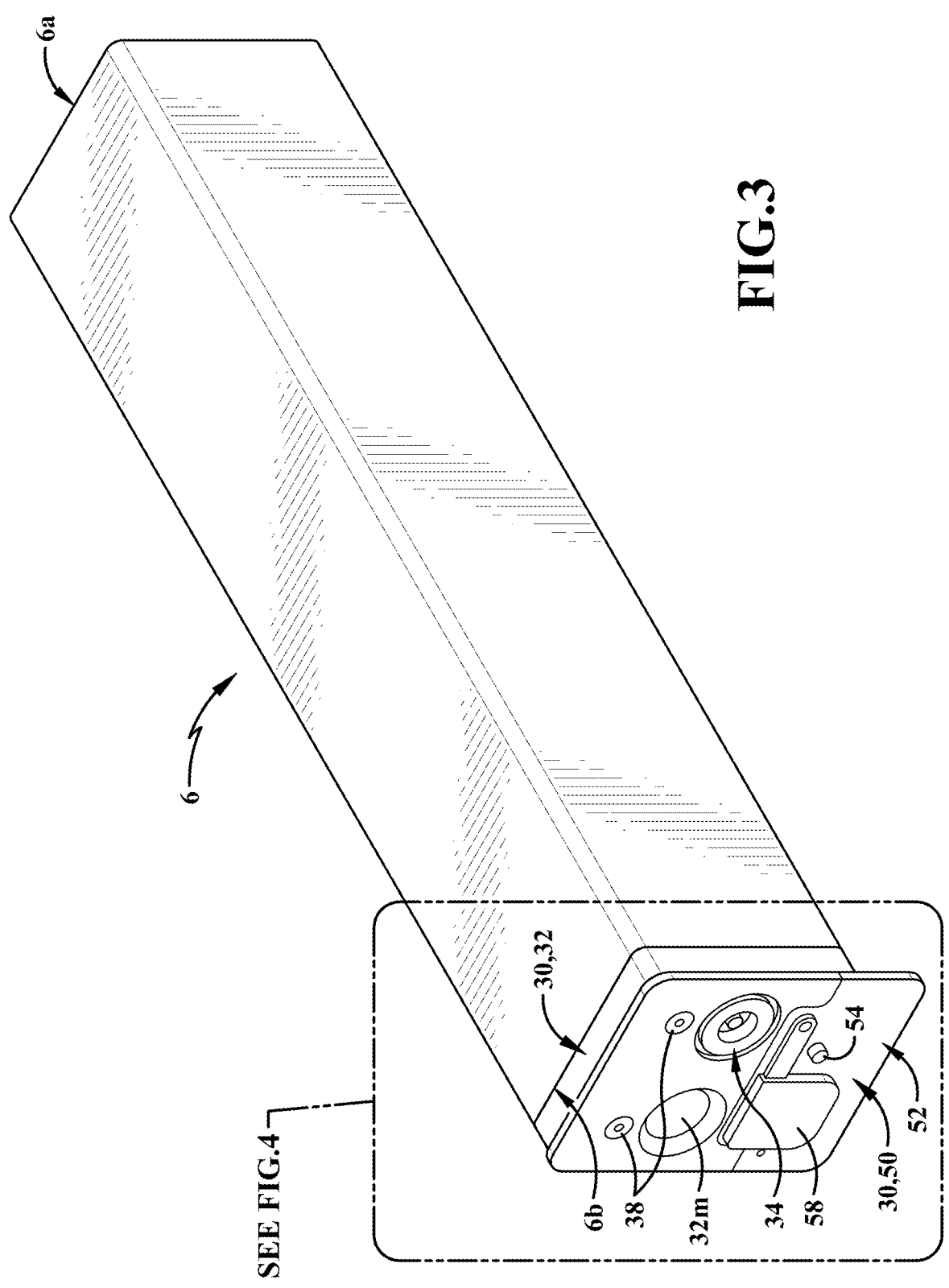
FIG. 3 (FIG. 3) is a rear, top, first side isometric view of the air vehicle loaded inside of a canister and the signal passthrough system is equipped to the canister.

Payload system 2 also includes a set of canisters 6 that are stored inside of dispenser assembly 4. As best seen in FIG. 3, each canister of the set of canisters 6 has a first end 6a, a second end 6b that is longitudinally opposite to the first end 6a, and a longitudinal axis defined therebetween. In the present disclosure, the first end 6a and the second end 6b of each canister 6 are each open ends. Each canister of the set of canisters 6 also defines a canister chamber 6c that extends between the first end 6a and the second end 6b. It should be noted that canister chamber 6c is also accessible at the first end 6a or the second end 6b due to such ends 6a, 6b being open. Canister 6 also includes a mounting device or spacer 6d that is positioned external to the canister chamber 6c and is used for alignment of canister 6 with the dispenser assembly 4.

Payload system 2 also includes a breechplate assembly 7 that operably engages with the dispenser assembly 4, particularly with the dispenser of the dispenser assembly 4. Breechplate assembly 7 includes at least a set of fire pins 8 that is operably engaged with a sequencer 9. In operation, sequencer 9 may send one or more signals to the breechplate assembly 7, particularly one or more fire pins of the set of fire pins 8, for various operations. In one instance, and as discussed in greater detail below, sequencer 9 may send a command or control signal to the breechplate assembly 7 to eject an air vehicle loaded inside of the dispenser assembly. In another instance, and as discussed in greater detail below, sequencer 9 may send another signal to the breechplate assembly 7 to determine a status of an air vehicle loaded inside of the dispenser assembly or to reset specific settings previously installed onto said air vehicle.

Platform is also loaded with a set of air vehicles or devices 10 inside of dispenser assembly 4. It should be understood that any suitable number of air vehicles may be loaded into dispenser assembly 4 of platform, which is dependent on the size of the dispenser of the dispenser assembly 4, the intended military operation, and other considerations that may limit the number of air vehicles to be loaded onto platform. The features and components of an air vehicle from the set of air vehicles 10 are now discussed in greater detail below.

The air vehicle 10 includes a body 12. As best seen in FIGS. 1-2, body 12 includes a first or front end (not shown), a second or rear end 12b that is longitudinally opposite to the front end, and a longitudinal axis "X" defined therebetween (see FIG. 2). Body 12 also defines an exterior surface 12c that extends circumferentially between the front end and the rear end 12b and is in communication with the exterior environment surrounding the body 12. Body 12 also defines an interior surface 12d that extends circumferentially between the front end and the rear end 12b and is free from being in communication with the exterior environment surrounding the body 12.

Figure 7A:
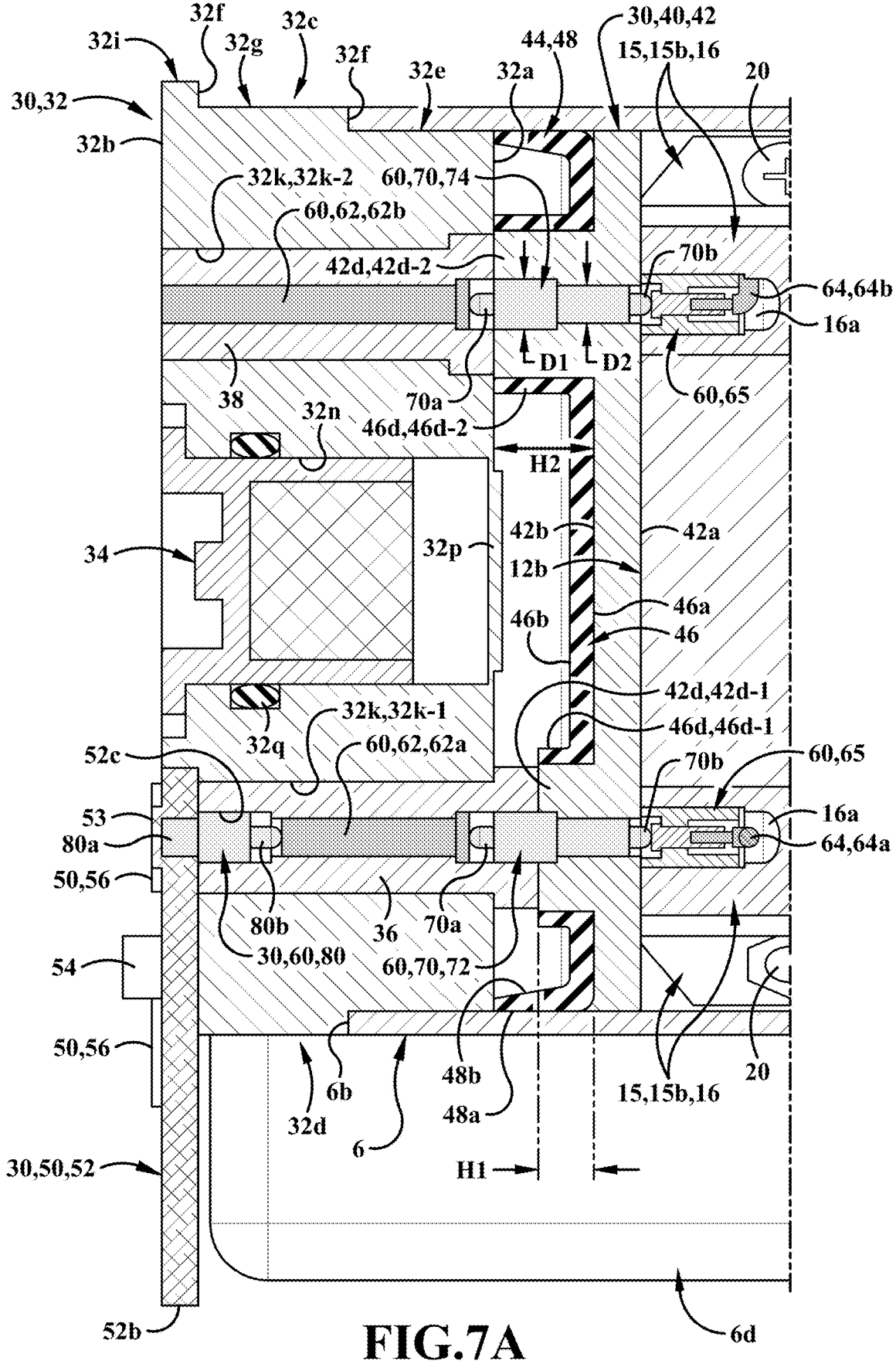
FIG. 7A (FIG. 7A) is a sectional view taken at a first position along the air vehicle in the direction of line 7A-7A shown in FIG. 4.
Figure 7B:
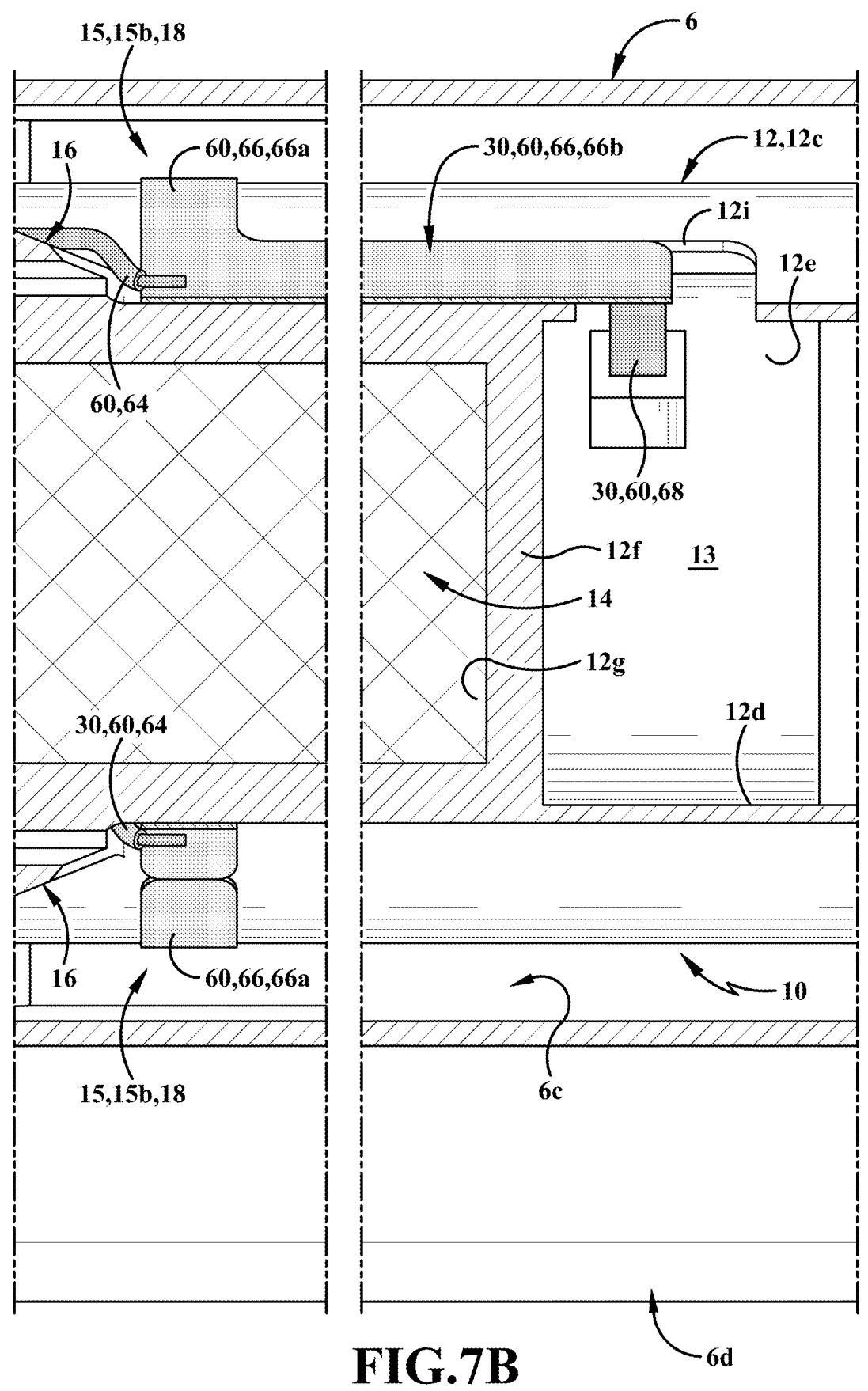
FIG. 7B (FIG. 7B) is another sectional view taken at a second position along the air vehicle in the direction of line 7B-7B shown in FIG. 4.

Still referring to body 12, body 12 also defines a first chamber 12e. As best seen in FIG. 7B, the first chamber 12e is defined between the front end of body 12 and an interior wall 12f that is positioned between the front end and the rear end 12b inside of body 12. Body 12 also defines a second chamber 12g between the rear end 12b and the interior wall 12f; both the first chamber 12e and the second chamber 12g are free from being in communication with one another due to the interior wall 12f separating each chamber 12e, 12g. In the present disclosure, the first chamber 12e and the second chamber 12g are each intended to house certain components for air vehicle 10. In one example, the first chamber 12e is configured to house electronic components and devices (generally referred to as 13 in FIG. 7B) needed for guiding and/or directing air vehicle 10 to a desired target; as such, first chamber 12e will be referred to herein as the electronic chamber 12e. In this same example, the second chamber 12g is environmentally sealed and is configured to house payloads and propulsion systems (generally referred to as 14 in FIG. 7B) needed for flying and/or detonating air vehicle 10 at a desired target; as such, second chamber 12g will be referred to herein as the sealed chamber 12g.

Still referring to body 12, body 12 defines a rear aperture 12h and a side aperture 12i. As best seen in FIG. 2, rear aperture 12h is defined in the rear end 12b of body 12 to allow propulsion energy to escape the body 12 from within the sealed chamber 12g once the air vehicle 10 is launched from platform. As best seen in FIGS. 1 and 8B, side aperture 12i is defined at a position along the body 12 that is aligned with the electronics chamber 12e. Side aperture 12i extends entirely through the body 12 from the exterior surface 12c to the interior surface 12d such that the exterior surface 12c and the interior surface 12d are in communication with one another at the side aperture 12i. As such, the exterior environment surrounding the body 12 and the electronics chamber 12*e* are in communication with one another at the side aperture 12*i*. Such use and purpose of side aperture 12*i* is discussed in greater detail below.

Each air vehicle 10 may also define key hole 12*k*. As best seen in FIG. 2, key hole 12*k* is defined in the rear end 12*b* of body 12. The key hole 12*k* is spaced apart from the rear aperture 12*h* and is free from being in communication with the rear aperture 12*h*. As discussed in greater detail below, the key hole 12*k* is configured to engage with a key of a piston so that the air vehicle 10 is loaded into the canister 6 in a specific orientation.

Each air vehicle 10 also includes a set of wing assemblies 15 that operably engage with the body 12. In the present disclosure, air vehicle 10 includes a front set of wing assemblies (not illustrated) that is positioned proximate to the front end, and a rear set of wing assemblies 15*b* that is positioned proximate to the rear end 12*b* and longitudinally opposite to the front set of wing assemblies. Each wing assembly of the set of wing assemblies 15 includes a base 16 that is fixedly engaged with the body 12, particularly the exterior surface 12*c* of body 12. Each wing assembly of the set of wing assemblies 15 includes a wing 18 that is pivotably engaged with a respective base 16 via a pivot mechanism 20.

With respect to the rear set of wing assemblies 15*b*, the base 16 of each rear wing assembly 15*b* defines a channel 16*a* and a set of openings 16*b* providing access to the channel 16*a*. As best seen in FIGS. 1-2 and 7A, the channel 16*a* of each base 16 is in direct communication with the rear end 12*b* of the body 12. It should be noted that due to such communication, the set of openings 16*b* is also in communication with the rear end 12*b* of the body 12. Such communication between the body 12 and each base 16 of the rear set of wing assemblies 15*b* allows electrical signals to be passed along the air vehicle 10 by a signal passthrough system (discussed below) without disturbing or interfering with the sealed chamber 12*g* and the components housed inside of the sealed chamber 12*g*.

Payload system 2 also includes a signal passthrough system or kit generally referred to herein as 30. In the present disclosure, a signal passthrough system 30 operably engages with a canister 6 and an air vehicle 10 loaded into said canister 6. As briefly discussed above, signal passthrough system 30 delivers electrical signals from the dispenser assembly 4 (external to the canister 6 and air vehicle 10) to the electronics 13 housed inside of electronics chamber 12*e* without disturbing or interfering with the sealed chamber 12*g*. Such components of signal passthrough system 30 are discussed in greater detail below.

Figure 5:
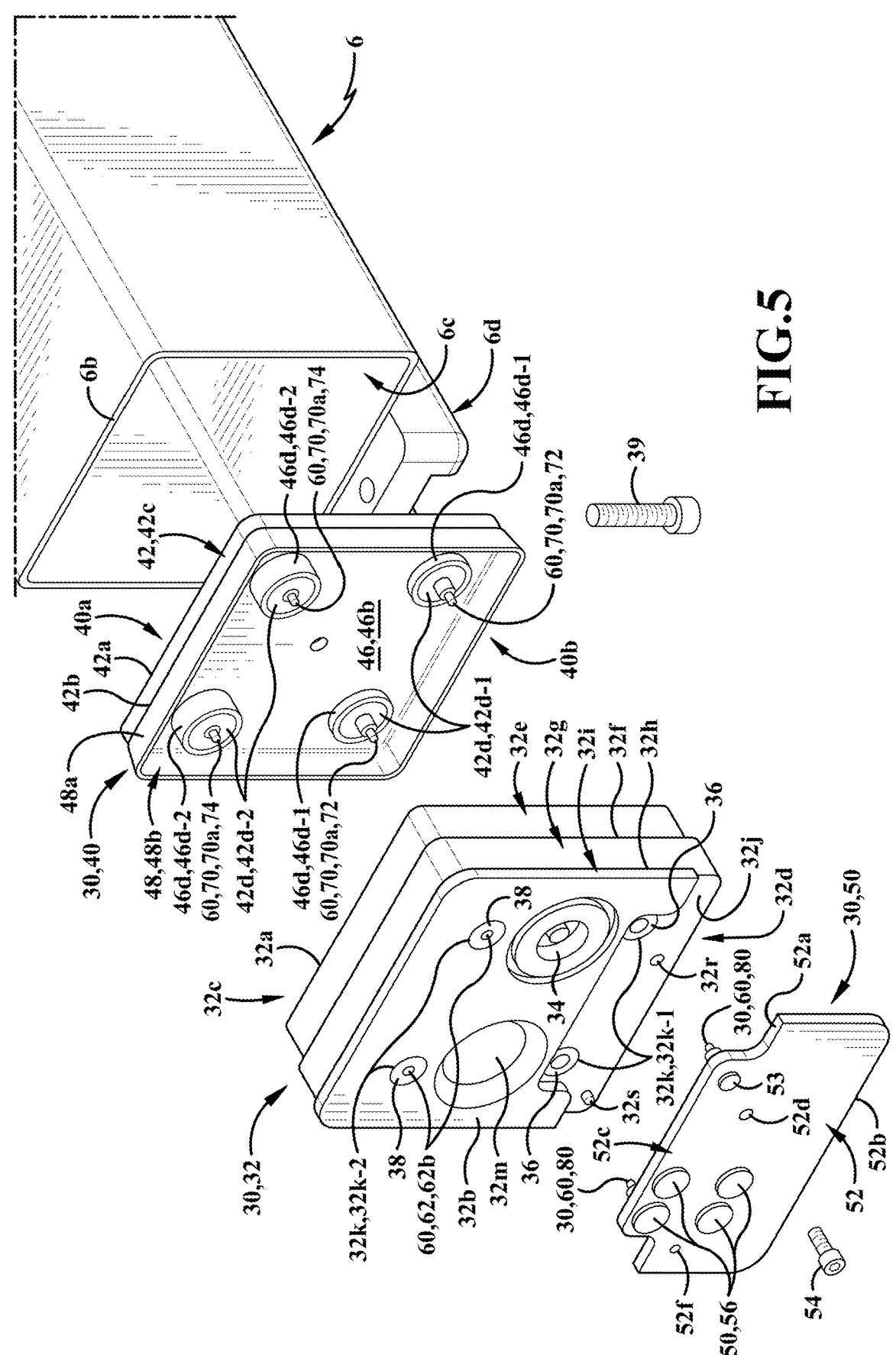
FIG. 5 (FIG. 5) is an exploded view of the signal passthrough system taken from a top, rear perspective view.
Figure 6:
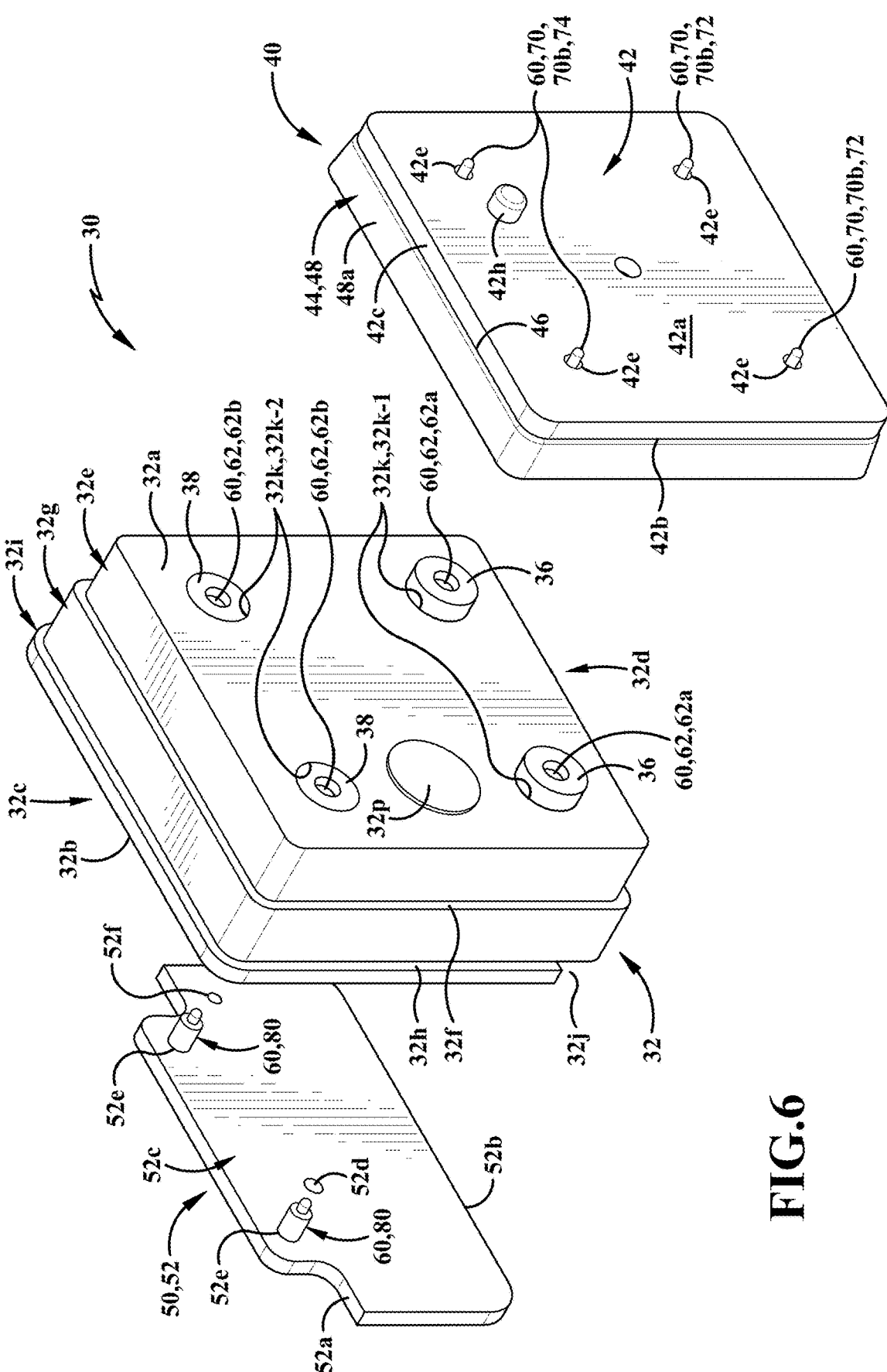
FIG. 6 (FIG. 6) is an exploded view of the signal passthrough system taken from a top, front perspective view.

Signal passthrough system 30 includes a backer plate 32 that operably engages with a respective canister 6 and with the body 12 of a respective air vehicle 10. As best seen in FIGS. 5-6, backer plate 32 includes a first or front end 32*a* that faces in the same direction of first end 6*a* of canister 6, and a second or rear end 32*b* that faces in the same direction of second end 6*b* of canister 6 and is opposite to the first end 32*a* of backer plate 32. Backer plate 32 also includes a top end 32*c* that is positioned above the first end 32*a* and the second end 32*b* when viewed from a longitudinal section view (see FIG. 7A), and a bottom end 32*d* that is positioned below the first end 32*a* and the second end 32*b* and opposite to the top end 32*c* when viewed from a longitudinal section view (see FIG. 7A).

Backer plate 32 also includes a first portion 32*e* that extends rearward from the first end 32*a* and to a first flange or stop 32*f*. Backer plate 32 also includes a second portion 32*g* that also extends rearward from the first portion 32*e* to a second flange or stop 32*h*. Backer plate 32 also includes a third portion 32*i* that extends from the second flange 32*h* to the second end 32*b*. It should be noted that the first flange 32*f* is a part of the second section 32*g*, and the second flange 32*h* is a part of the third section 32*i*. Backer plate 32 also defines a rear recess 32*j* in the third section 32*i* that extends into the third section 32*i* from the second end 32*b* towards the first end 32*a*; such use and purpose of rear recess 32*j* is discussed in greater detail below.

Still referring to backer plate 32, backer plate 32 also includes a set of passageway 32*k*. As best seen in FIGS. 5-6, each passageway of the set of passageways 32*k* extends entirely through the backer plate 32 from the first end 32*a* to the second end 32*b*; as such, the first end 32*a* and the second end 32*b* are in direct communication with one another at each passageway of the set of passageways 32*k*. As discussed in greater detail below, each passageway of the set of passageways 32*k* is configured to house a set of electrical connections of a signal path assembly of signal passthrough system 30 to deliver electrical signals from the dispenser assembly 4 to the electronics 13 of air vehicle 10.

Backer plate 32 also defines a rear cavity 32*m*. As best seen in FIG. 6, the rear cavity 32*m* extends into the backer plate 32 from second end 32*b* and terminates at the second portion 32*g*. The rear cavity 32*m* is also positioned between a pair of passageways of the set of passageways 32*k*. In operation, a fire pin may be housed inside of the rear cavity 32*m* for grounding needs when firing a squib or similar propulsion device.

Backer plate 32 also defines a squib passageways 32*n* that is adjacent to the rear cavity 32*m*. As best seen in FIGS. 6 and 7A, the squib passageway 32*n* extends entirely through the backer plate 32 from the first end 32*a* to the second end 32*b*. Backer plate 32 also includes a cover plate 32*p* that is positioned at the first end 32*a* of the backer plate 32. The cover plate 32*p* shields access into the squib passageway 32*n* at the first end 32*a* to temporarily seal the squib passageway 32*n*. In operation, a squib 34 is housed inside of the squib passageway 32*n* and will separate the cover plate 32*p* from the first end 32*a* of the backer plate 32 due to the kinetic energy generated by said squib 34. Additionally, an O-ring or retention member 32*q* may be seated inside of the squib passageways 32*n* to frictional fit the squib 34 inside of the squib passageway 32*n*.

Signal passthrough system 30 also includes a pair of first inserts 36 and a set of second inserts 38 that operably engage with backer plate 32. As best seen in FIGS. 6-7A, each insert of the pair of first inserts 36 operably engages with the backer plate 32 inside a first pair of passageways 32*k*-1 of the set of passageways 32*k* that are positioned between the bottom end 32*d* and the rear cavity 32*m* and the squib passageway 32*n*. Still referring to FIGS. 6-7A, each insert of the pair of second inserts 38 operably engages with the backer plate 32 inside a second pair of passageways 32*k*-2 of the set of passageways 32*k* that are positioned between the top end 32*c* and the rear cavity 32*m* and the squib passageway 32*n* and vertically below the first pair of passageways 32*k*-1.

Upon assembly, the pair of second inserts 38 are positioned entirely inside of the second pair of passageways 32*k*-2 of the backer plate 32 (see FIGS. 6-7A). However, with respect to the pair of first inserts 36, a portion of each insert of the pair of first inserts 36 is positioned outside of the respective passageways 32*k*-1 and in front of first end 32*a* (see FIGS. 6-7A). As discussed in greater detail below, such structural configuration among the backer plate 32, the pair of first inserts 36, and the pair of second inserts 38 may assist operators or users in properly installing and loading the backer plate 32 with the canister 6 and the air vehicle 10.

Signal passthrough system 30 also includes a connector or bolt 39 that engages the backer plate 32 with the canister 6. In the present disclosure, bolt 39 passes through the canister 6, particularly the mounting device 6d, and threadably engages with a threaded hole (not illustrated) that is defined in the bottom end 32d of backer plate 32. Upon such engagement by the bolt 39, backer plate 32 is engaged and secured to the canister 6 at the rear end 6b of canister 6.

Signal passthrough system 30 also includes a piston 40. As best seen in FIGS. 5-6, piston 40 includes a first or front end 40a that faces in the same direction of first end 6a of canister 6, and a second or rear end 40b that faces the first end 32a of backer plate 32 and is opposite to the first end 40a of piston 40.

Still referring to piston 40, piston 40 also includes a main body 42 that includes a first or front surface 42a that faces in the same direction of first end 6a of canister 6, and a second or rear surface 42b that faces the first end 32a of backer plate 32 and is opposite to the first surface 42a of main body 42. Main body 42 also includes a peripheral edge 42c that extends between the first surface 42a and the second surface 42b.

Main body 42 also includes a set of hollow protrusions 42d. As best seen in FIG. 7A, each protrusion of the set of hollow protrusions 42d extends in a rearward direction from the second surface 42b towards the backer plate 32. Each protrusion of the set of hollow protrusions 42d also defines a passageway 42e that extends entirely from the first surface 42a, through the second surface 42b, and out the hollow protrusion 42d. Main body 42 also includes a set of internal lips 42f where each internal lip is positioned inside of each protrusion of the set of protrusions 42d. As best seen in FIG. 7A, each passageway 42e defined in a respective protrusions 42d has a first diameter (arrows labeled "D1") that is measured from the first surface 42a to the respective internal lip 42f and a second diameter (arrows labeled "D2") that is measured from the internal lip 42f to the rearmost end of the protrusion 42d. In the present disclosure, the second diameter D2 is greater than the first diameter D1; such use of differing diameters inside of each protrusion 42d is discussed in greater detail below.

Still referring to the set of protrusions 42d, certain protrusions have different heights. As best seen in FIG. 7A, a first pair of protrusions 42d-1 of the set of hollow protrusions 42d is aligned with the first pair of passageways 32k-1 each have a first height H1 this measured from the second surface 42b to the rearmost end of the respective protrusion of the first pair of protrusions 42d-1. Additionally, and as best seen in FIG. 7A, a second pair of protrusions 42d-2 of the set of hollow protrusions 42d is aligned with the second pair of passageways 32k-2 each have a second height H2 this measured from the second surface 42b to the rearmost end of the respective protrusion of the second pair of protrusions 42d-2. In the present disclosure, the first height H2 of each protrusion of the second pair of protrusions 42d-2 is greater than the second height H1 of each protrusion of the first pair of protrusions 42d-1.

Main body 42 also includes a keyed portion 42h. As best seen in FIG. 6, the keyed portion 42h extends in a forward direction from the first surface 42a of the main body 42. In operation, the keyed portion 42h is configured to engage with the air vehicle 10 inside of the key hole 12k defined in the rear end 12b of body 12. Such structural engagement between the rear end 12b of body 12 and the keyed portion 42h of main body 42 prevents operators from incorrectly loading the air vehicle 10 into the canister 6 and incorrectly connecting the air vehicle 10 with the signal passthrough system 30.

Piston 40 also includes a gasket 44 that operably engages with the main body 42. As best seen in FIG. 7A, gasket 44 includes a base wall 46 having a first or front surface 46a that engages with the second surface 42b of main body 42, a second or rear surface 46b that is opposite to the first surface 46a and is remote from the main body 42. Base wall 46 also includes a peripheral edge 46c that extends between the first surface 46a and the second surface 46b. It should be noted that gasket 44 is made from a resilient material that seals off space forward of the gasket 44 from the space that is defined rearward of the gasket 44.

Still referring to base wall 46, base wall 46 also includes a set of hollow extensions 46d. As best seen in FIG. 7A, each extension of the set of hollow extensions 46d extends in a rearward direction from the second surface 46b towards the backer plate 32. Similar to main body 42, certain extensions have different heights. As best seen in FIG. 7A, a first pair of extensions 46d-1 of the set of hollow extensions 46d is aligned with the first pair of passageways 32k-1 and each have the first height H1 that is measured from the second surface 46b to the rearmost end of the respective extension of the first pair of extensions 46d-1. Additionally, and as best seen in FIG. 7A, a second pair of extensions 46d-2 of the set of hollow extensions 46d is aligned with the second pair of passageways 32k-2 and each have the second height H2 this measured from the second surface 46b to the rearmost end of the respective extension of the second pair of extensions 46d-2. In the present disclosure, the first height H1 of each extension of the first pair of extensions 46d-1 is less than the second height H2 of each extension of the second pair of extensions 46d-2.

Gasket 44 also includes an upright wall 48 that extends outwardly from the peripheral edge 46c. As best seen in FIG. 7A, upright wall 48 includes an outer surface 48a that directly contacts the inner surface of the canister 6 inside of the canister chamber 6c. Upright wall 48 also includes an inner surface 48b that is opposite to the outer surface 48a.

Figure 4:
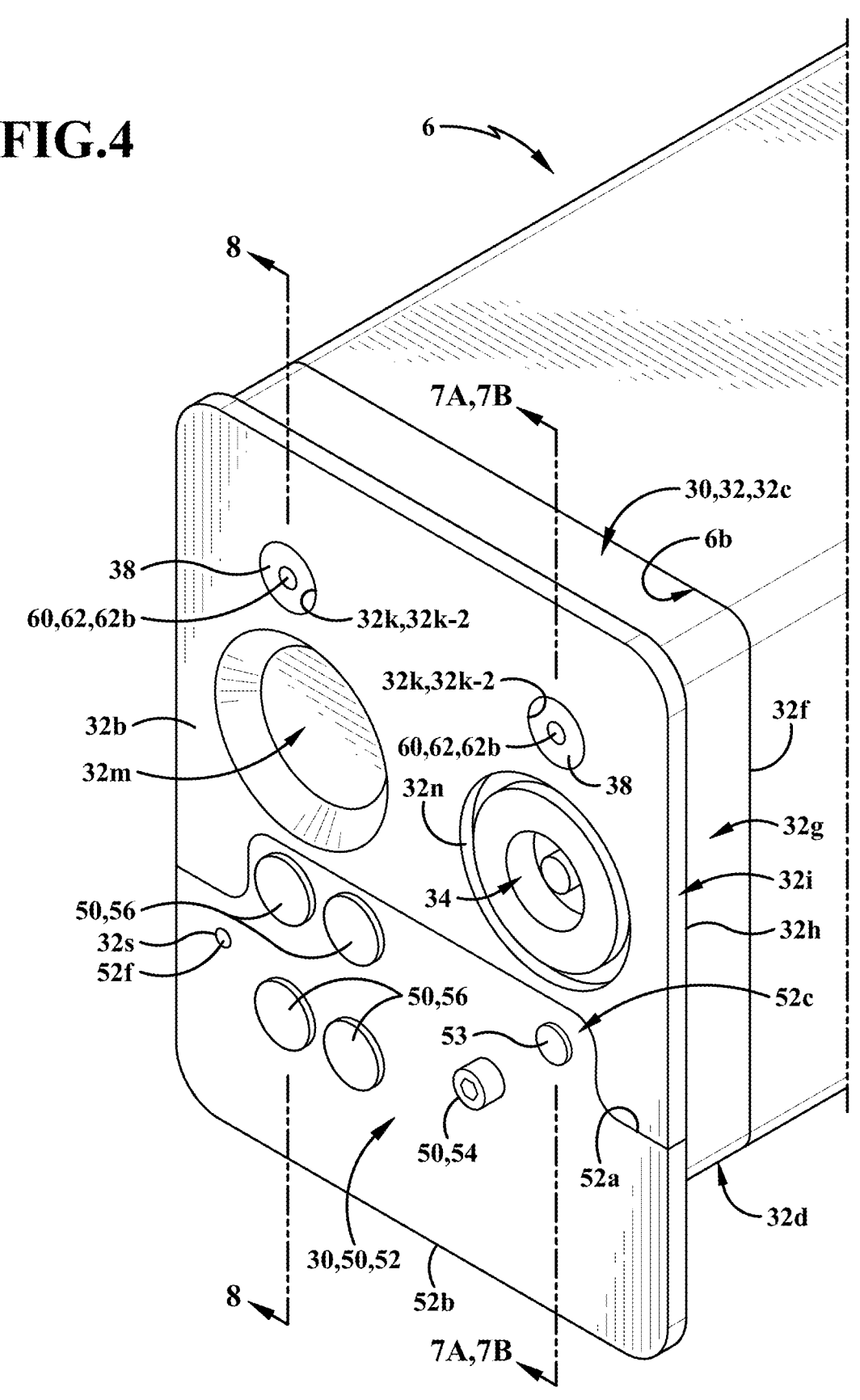
FIG. 4 (FIG. 4) is a partial top, rear perspective view of the air vehicle shown in FIG. 1, wherein a cover of the signal passthrough system is removed from a circuit card assembly of the signal passthrough system.

Signal passthrough system 30 also includes a circuit card assembly (hereinafter referred to as "CCA") generally referred to as 50. CCA 50 includes a printed circuit board (PCB) 52 that operably engages with the backer plate 32, particularly inside of the rear recess 32j of the backer plate 32 (see FIG. 4). PCB 52 includes a top end 52a, a bottom end 52b that is vertically opposite to the top end 52a, an extension 52c extending outwardly from the top end 52a, and an attachment aperture 52d defined in the PCB 52 proximate to the bottom end 52b. Upon assembly, the PCB 52 fits inside of the rear recess 32j of backer plate 32 such that the second end 32b of backer plate 32 and the PCB 52 are flush with one another. Upon assembly, a connector 54 may be passed through the PCB 52 at the attachment aperture 54d and threadably engage with the backer plate 32 at threaded aperture 32r.

Still referring to PCB 52, PCB 52 also defines a pair of plunger apertures 52e and a securement aperture 52f. As best seen in FIGS. 5-6, the pair of plunger apertures 52e is defined in the extension 52c of PCB 52 to house a pair of CCA plungers which are discussed in greater detail below. Still referring to FIGS. 5-6, the securement aperture 52f is defined below the extension 52c and is transversely opposite to the attachment aperture 52d. The securement aperture 52f allows an alignment pin 32s of the backer plate 32 to pass into and engage with the PCB 52 so that the PCB 52 is engaged with the backer plate 32 as the backer plate 32 and PCB 52 are assembled with one another.

While not illustrated herein, PCB 52 may include any suitable electrical components and devices for communicating with the air vehicle 10, launching the air vehicle 10 from the platform, and other functions that may be useful based on the operations discussed herein.

Still referring to CCA 50, a set of dispenser terminals 56 are connected with the PCB 52. In operation, each dispenser terminal of the set of dispenser terminals 56 is connected with specific electrical connections of a signal path assembly of the signal passthrough system 30 for sending signals to the air vehicle 10 for communication purposes. The set of dispenser terminals 56 may also be protected by a protective cover 58. As best seen in FIG. 3, the protective cover 58 is secured to the PCB 52, by a securement member 53 engaged with PCB 52, for protecting the set of dispenser terminals 56 before such canister 6, air vehicle 10, and signal passthrough system 30 being loaded into dispenser assembly 4. The protective cover 58 may be removed from the PCB 52 as an operator is collectively loading the canister 6, air vehicle 10, and signal passthrough system 30 into dispenser assembly 4.

As mentioned previously, signal passthrough system 30 also includes a signal path assembly 60. As discussed in greater detail below, signal path assembly 60 is configured to deliver signals from outside of the canister 6 and the air vehicle 10 (i.e., from the payload system 2) to the electronics 13 housed inside of the air vehicle 10 without disturbing or interfering with the sealed chamber 12g of air vehicle 10 or pressure chamber that is used for ejection purposes. Such components and devices of signal passthrough system 30 are discussed in greater detail below.

Signal path assembly 60 includes a set of electrical connections 62. As best seen in FIG. 7A, the set of electrical connections 62 operably engages with and is housed inside of backer plate 32. Particularly, the set of electrical connections 62 operably engages with the pair of first inserts 36 and the pair of second inserts 38 inside of the backer plate 32. In the present disclosure, the set of electrical connections 62 includes a pair of first connections or control connections 62a and a pair of second connections or status connection 62b. As best seen in FIG. 7A, each connection of the pair of first connections 62a is housed inside of the pair of first inserts 36, and each connection of the pair of second connections 62b is housed inside of the pair of second inserts 38.

Signal path assembly 60 also includes a set of jumper connections 64 that is operable to communicate with the set of electrical connections 62. As best seen in FIG. 7A, the set of jumper connections 64 operably engages with and is housed inside of air vehicle 10. Particularly, the set of jumper connections 64 operably engages with the bases 16 of the set of wing assemblies 14 inside of the channels 16a and set of openings 16b. In the present disclosure, the set of jumper connections 64 includes a pair of first jumpers or control jumpers 64a and a pair of second jumpers or status jumpers 64b. As best seen in FIG. 7A, each jumper of the pair of first jumpers 64a is operable to communicate with the pair of first connections 62a inside of canister 6, and each jumper of the pair of second jumpers 64b is operable to communicate with the pair of second connections 62b inside of canister 6. Such operability between the set of electrical connections 62 and the set of jumper connections 64 is discussed in greater detail below.

Signal path assembly 60 also includes a set of vehicle or tail fin terminals 65. As best seen in FIGS. 2 and 7A, each tail fin terminal of the set of tail fin terminals 65 operably engages with a respective base 16 of a respective rear set of wing assembly 15b inside of the channel 16a. In the present disclosure, each tail fin terminal of the set of tail fin terminals 65 is operable to communicate with a respective jumper connection of the set of jumper connections 64 due to the set of jumper connections 64 and the set of tail fin terminals 65 being connected with one another. As discussed in greater detail below, each tail fin terminal of the set of tail fin terminals 65 is also operable to communicate with a respective electrical connection of the set of electrical connections 62 via a piston plunger disposed inside of the piston 40.

Signal path assembly 60 also includes a flex circuit unit 66 (hereinafter referred to as "flex circuit") that is operable to communicate with the set of jumper connections 64. As best seen in FIG. 1, flex circuit 66 includes a first or input terminal 66a that operably engages with the set of jumper connections 64 outside of the air vehicle 10. Particularly, the input terminal 66a operably engages with the set of jumper connections 64 outside of the body 12 and outside of the set of wing assemblies 14. Flex circuit 66 also includes a second or output terminal 66b that operably engages with the electronics 13 of air vehicle 10 inside of the electronics chamber 12e (see FIG. 7B). Particularly, the output terminal 66b operably engages with the electronics 13 of air vehicle 10 inside of the electronics chamber 12e via a header connector 68.

In the present disclosure, the flex circuit 66 operably engages with the exterior surface 12c of body 12 in order to pass signals along the air vehicle 10 without disturbing or interfering with the sealed chamber 12g. As best seen in FIGS. 1 and 2, the input terminal 66a of flex circuit 66 extends circumferentially about a portion of the body 12 such that the input terminal 66a is positioned outside of the sealed chamber 12g. The output terminal 66b of flex circuit 66 extends longitudinally along the length of the body 12 such that the output terminal 66b is also positioned outside of the sealed chamber 12g.

Signal path assembly 60 also includes a set of piston plungers 70 that operably engages with the piston 40. Particularly, each piston plunger of the set of piston plungers 70 operably engages with the set of protrusions 42d of the main body 42 inside of the set of passageways 42e. As best seen in FIG. 7A, each piston plunger of the set of piston plungers 70 includes an input button or terminal 70a that operably engages with an output terminal of a respective electrical connection of the set of electrical connections 62. Still referring to FIG. 7A, each piston plunger of the set of piston plungers 70 includes an output button or terminal 70b that operably engages with an input terminal of a respective jumper connection of the set of jumper connections 64 via a respective tail fin terminal 65.

The set of piston plungers 70 is also broken into pairs of pistons plungers. As best seen in FIGS. 5-6, a pair of first piston plungers or control piston plungers 72 operably engages with the main body 42 of the piston 40. Particularly, the pair of first piston plungers 72 operably engages with the first pair of protrusions 42d-1 of the main body 42. Still referring to FIGS. 5-6, a pair of second piston plungers or status piston plungers 74 operably engages with the main body 42 of the piston 40. Particularly, the pair of second piston plungers 74 operably engages with the second pair of protrusions 42d-2 of the main body 42.

It should be noted that each piston plunger of the set of piston plungers 70 is a double-action biasing conductive spring plunger. As such, the input button 70a and the output button 70b of each piston plunger of the set of piston plungers 70 are each biased and formed from conductive material. In one example, the input button 70*a* may travel in a linear direction relative to the respective protrusion of the set of protrusions 42*d* when the input button 70*a* is engaged and pressed by a respective electrical connection of the set of electrical connections 62. In this same example, the input button 72 may also receive and transmit one or more signals through the piston plunger and to the output button 70*b*. In another example, output button 70*b* may also travel in a linear direction relative to the respective protrusion of the set of protrusions 42*d* when the output button 70*b* is engaged and pressed by a respective jumper connection of the set of jumper connections 64. In this same example, the output button 70*b* may also receive and transmit one or more signals to the respective jumper connection of the set of jumper connections 64.

Signal path assembly 60 also includes a set of CCA plungers 80 that operably engages with the PCB 52 of CCA 50. Particularly, each piston plunger of the set of CCA plungers 80 operably engages with the PCB 52 inside of the pair of plunger apertures 52*e*. As best seen in FIG. 7A, each CCA plunger of the set of CCA plungers 80 includes an input terminal 80*a* that operably engages with an output terminal of a respective circuit component of the PCB 52. Still referring to FIG. 7A, each CCA plunger of the set of CCA plungers 80 includes an output button or terminal 80*b* that operably engages with an input terminal of a respective electrical connection of the set of electrical connections 62.

It should be noted that each CCA plunger of the set of CCA plungers 80 is a single-action biasing conductive spring plunger. As such, the output button 80*b* of each CCA plunger of the set of CCA plungers 80 is biased and is conductive. In one example, output button 80*b* may also travel in a linear direction relative to the PCB 52 when the output button 80*b* is engaged and pressed by a respective electrical connection of the set of electrical connections 62. In this same example, the output button 80*b* may also receive and transmit one or more signals through the CCA plunger and to the respective electrical connection of the set of electrical connections 62.

Having now discussed the signal passthrough system 30 being implemented with payload system 2, canister 6, and air vehicle 10, methods of installing the signal passthrough system 30 and sending signals with signal passthrough system 30 are discussed in greater detail below.

Prior to sending one or more signals to the air vehicle 10 from the exterior environment, an operator must first load the air vehicle 10 into a respective canister 6. In the present disclosure, the air vehicle 10 is configured to be housed entirely inside of the canister chamber 6*c* between the first end 6*a* and the second end 6*b*. Upon such loading, the air vehicle 10 includes the flex circuit 66 that is positioned on the exterior surface 12*c* of body 12. Prior to loading, the input terminal 66*a* of the flex circuit 66 operably engages with the output terminals of the set of jumper connections 64, and the output terminal 66*b* of the flex circuit 66 operably engages with the electronics 13 of air vehicle 10 by the header 68 (see FIGS. 7A-7B).

Concurrently, operator may also operably engage the signal passthrough system 30 with the canister 6 and the air vehicle 10. As best seen in FIG. 7A, the piston 40 may be inserted into the canister chamber 6*c* at the second end 6*b* in which the gasket 44 slides along the interior wall of the canister 6 inside of canister chamber 6*c*. The operator may continue to insert the piston 40 into the canister 6 until the main body 42 contacts and abuts the rear end 10*b* of the air vehicle 10. At this stage, the output terminals 70*b* of the set of piston plungers 70 contact and connect with the set of jumper connections 64 via tail fin terminals 65 located inside of the channels 16*a* of the bases 16 of the rear set of wing assemblies 15*b*. It should be noted that the output terminals 70*b* of the set of piston plungers 70 may travel linearly into the main body 42 when the output terminals 70*b* are pressed against the tail fin terminals 65 as the piston 40 moves through the canister 6 from the second end 6*b* towards the first end 6*a*.

As noted previously, the main body 42 of piston 40 includes keyed portion 42*h* that is configured to operably engage with the body 12 of air vehicle 10 inside of key hole 12*k*. When the piston 40 is aligned in the correct orientation, the keyed portion 42*h* must be received by and engage with the body 12 of the air vehicle 10 inside of key hole 12*k*.

Once the piston 40 is installed, operator may then operably engage the backer plate 32 with the canister 6 and the piston 40. As best seen in FIG. 7A, the backer plate 32 may be inserted into the canister chamber 6*c* at the second end 6*b* until the first end 32*a* of backer plate 32 contacts and directly abuts the piston 40 and the first flange 32*f* contacts and directly abuts the rear end 6*b* of canister 6. At this stage, the set of electrical connections 62 also contacts the input terminals 70*a* of the set of piston plungers 70 once the backer plate 32 and the piston 40 operably engage with one another inside of the canister 6. It should be noted that the input terminals 70*a* of the set of piston plungers 70 may travel linearly into the main body 42 when the input terminals 70*a* are pressed against the set of electrical connections 62 as the backer plate 32 moves through the canister 6 from the second end 6*b* towards the first end 6*a*. Once engaged with the canister 6 and the piston 40, bolt 39 is passed through the backer plate 32 and threadably engages with the canister 6 to secure the backer plate 32 with the canister 6 behind the air vehicle 10. It should also be noted that squib 34 may be installed with backer plate 32 prior to or subsequent to installing the backer plate 32 with the canister 6.

It should be noted that backer plate 32 and piston 40 must also be aligned in the desired orientation based on the alignment among the pair of first inserts 36, the pair of first protrusions 42*d*-1, and the pair of first extensions 46*d*-1 and the alignment among the pair of second inserts 38, the pair of second protrusions 42*d*-2, and the pair of second extensions 46*d*-2. As best seen in FIGS. 7A and 8, the pair of first inserts 36 of the backer plate 32 is aligned with the pair of first protrusions 42*d*-1 and the pair of first extensions 46*d*-1. Similarly, and as best seen in FIGS. 7A and 8, the pair of second inserts 38 of the backer plate 32 is also aligned with the pair of second protrusions 42*d*-2 and the pair of first extensions 46*d*-2. Such required alignment between the backer plate 32 and the piston 40 may prevent the operator from improperly loading the backer plate 32 and piston 40 into canister 6 prior to operating platform.

Prior to or subsequent to installing the backer plate 32 with the canister 6, CCA 50 operably engages with the backer plate 32. As best seen in FIG. 7A, PCB 52 operably engages with the backer plate 32 where a portion of the PCB 52 is housed inside of the rear recess 32*j*. At this stage, the set of electrical connections 62 also contacts the output terminals 80*b* of the set of CCA plungers 80 once the backer plate 32 and the PCB 52 operably engage with one another outside of the canister 6. It should be noted that the output terminals 80*a* of the set of CCA plungers 80 may travel linearly into the PCB 52 when the output terminals 80*a* are pressed against the set of electrical connections 62 as the PCB 52 engages the backer plate 32. Once engaged with the backer plate 32, connector 54 is passed through the PCB 52 at attachment aperture 52*d* and threadably engages with the backer plate 32 at the threaded aperture 32*r* to secure the PCB 52 with the backer plate 32 behind the air vehicle 10.

It should be noted that prior to loading the canister 6, the air vehicle 10, and the signal passthrough system 30 into the dispenser assembly 4, protective cover 58 may also be removed from the PCB 52 so that dispenser terminals 56 are in communication with the exterior environment and may engage with fire pins 8 of breechplate 7.

Once the air vehicle 10 and signal passthrough system 30 are loaded into the canister 6, the canister 6, the air vehicle 10, and the signal passthrough system 30 are loaded into the dispenser assembly 4, particularly a dispenser of the dispenser assembly 4. As best seen in FIG. 8, one or more fire pins 8 of the breechplate 7 may operably engage with one or more electrical connections and/or devices provided with signal passthrough system 30. Particularly, and as best seen in FIG. 8, fire pins 8 may connect with the first pair of electrical connections 62*a* of the set of electrical connections 62, via dispenser terminals 56 and the pair of CCA plungers 80, in order for sequencer 9 to send signals to the electronics 13 onboard the air vehicle 10. Such signals sent between the sequencer 9 and the electronics 13 are transmitted outside of the sealed chamber 12*g* of the body 12 due to the structural configuration of the signal passthrough system 30 discussed herein.

In operation, sequencer 9 may send a command signal to the fire pin 8 in order to communicate with the electronics 13 of air vehicle 10. Initially, the command signal is transmitted from the fire pin 8 to the dispenser terminal 56, through the pair of CCA plungers 80, and to the pair of first electrical connections 62*a*. The command signal is further transmitted from the pair of first electrical connections 62*a* to the pair of control piston plungers 72, through the tail fin terminals 65, and to the pair of first jumper connections 64*a*. The command signal is then transmitted through the bases 16 of the set of wing assemblies, via the channels 16*a* and sets of openings 16*b*, such that the signal is transmitted away from the sealed chamber 12*g*. The command signal is further transmitted along the flex circuit 66 from the input terminal 66*a* to the output terminal 66*b* in which the command signal finally reaches the electronics 13 of the air vehicle 10.

In other embodiments, additional fire pins not illustrated herein may also contact and connect with additional electrical connections mentioned herein. In one example, fire pins may engage with the second pair of electrical connections 62*b* so that sequencer 9 may communicate with the electronics 13 of air vehicle 10 to know the status of the air vehicle 10 when the platform is being operated. In another example, fire pins may engage with the second pair of electrical connections 62*b* so that sequencer 9 may communicate with the electronics 13 of air vehicle 10 to reset specific parameters or programs of the electronics 13 prior to operating the platform in a military operation. In another example, fire pins may engage the backer plate 32 (inside of the rear cavity 32*m*) and squib 34 to ignite squib 34 for launching the air vehicle 10 from the canister 6.

FIG. 9 illustrates a method 100. An initial step 102 of method 100 includes installing a backer plate of a signal passthrough kit to a canister, wherein the canister houses an air vehicle and an electronic assembly. Another step 104 of method 100 includes installing a piston of the signal passthrough kit between the backer plate and the air vehicle inside of the canister. Another step 106 of method 100 includes installing a circuit card assembly with the backer plate positioned outside of the canister. Another step 108 of method 100 includes installing a signal path assembly of the signal passthrough kit with the backer plate, the piston, the circuit card assembly, the air vehicle, and the electronic assembly; wherein the signal path assembly is configured to output at least one signal to the electronic assembly external to a pressure chamber defined in the air vehicle.

In other exemplary embodiments, method 100 may include additional or optional steps. In one exemplary embodiment, method 100 may further include that the step of installing the signal path assembly further comprises: installing a set of electrical connections of the signal path assembly with the circuit card assembly and the backer plate; installing a set of jumper connections of the signal path assembly with the set of electrical connections; installing a flex circuit with the set of jumper connections and with the air vehicle, wherein the flex circuit is disposed about an outer surface of a body of the air vehicle; and connecting the flex circuit and the electronic assembly of the air vehicle with a header of the signal path assembly. In another exemplary embodiment, method 100 may further include that that step of installing the set of jumper connections of the signal path assembly further includes that each jumper connection of the set of jumper connections passes through a channel defined in the body and in a respective wing assembly of a set of wing assemblies of the air vehicle remote from the pressure chamber.

The system of the present disclosure may additionally include one or more sensors to sense or gather data pertaining to the surrounding environment or operation of the system. Some exemplary sensors capable of being electronically coupled with the system of the present disclosure (either directly connected to the system of the present disclosure or remotely connected thereto) may include but are not limited to: accelerometers sensing accelerations experienced during rotation, translation, velocity/speed, location traveled, elevation gained; gyroscopes sensing movements during angular orientation and/or rotation, and rotation; altimeters sensing barometric pressure, altitude change, terrain climbed, local pressure changes, submersion in liquid; impellers measuring the amount of fluid passing thereby; global positioning sensors sensing location, elevation, distance traveled, velocity/speed; audio sensors sensing local environmental sound levels, or voice detection; photo/light sensors sensing ambient light intensity, ambient, day/night, UV exposure; TV/IR sensors sensing light wavelength; temperature sensors sensing machine or motor temperature, ambient air temperature, and environmental temperature; radar sensors; lidar sensors; ultrasonic sensors; magnetic sensors, image sensors; and moisture sensors sensing surrounding moisture levels.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Any flowchart and/or block diagrams in the Figures illustrate some exemplary architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, firmware or a combination thereof. When implemented in software, the software code or instructions can be executed on any suitable processor or collection of processors, whether provided in a single computer or distributed among multiple computers or in firmware. Furthermore, the instructions or software code can be stored in at least one non-transitory computer readable storage medium.

Also, a computer or smartphone may be utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that are executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments. As such, one aspect or embodiment of the present disclosure may be a computer program product including least one non-transitory computer readable storage medium in operative communication with a processor, the storage medium having instructions stored thereon that, when executed by the processor, implement a method or process described herein, wherein the instructions comprise the steps to perform the method(s) or process(es) detailed herein.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the methods or processes of the present disclosure, which may incorporate some aspects of natural phenomenon, the process or method steps are additional features that are new and useful.

More particularly, the system of the present disclosure, which may include the logic(s) presented herein, includes the features, components, techniques or processes detailed herein that, as combined, accomplished the desired results detailed herein. These specific elements, configuration or techniques of the system of the present disclosure, some of which may be included in at least one of the appended claims, accomplish these desired results to overcome the then existing problems in the relevant field of computer processor-based systems. Additionally, the features, components, techniques or processes of the system of the present disclosure, are an unconventional arrangement of elements or unconventionally perform a method detailed herein that was unavailable without the unconventional arrangement of elements. These exemplary, yet particular, arrangements provide an improvement over existing technologies that have failed to operate in the manner, and with the efficiency that is taught by the system of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc. As another example, "at least one of: A, B, or B" is intended to cover A, B, C, A-B, A-C, B-C, and A-B-C, as well as any combination with multiple of the same item.

While components of the present disclosure are described herein in relation to each other, it is possible for one of the components disclosed herein to include inventive subject matter, if claimed alone or used alone. In keeping with the above example, if the disclosed embodiments teach the features of components A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A system, comprising:
a canister having a first end, a second end longitudinally opposite to the first end, and a canister chamber defined between the first end and the second end;
an air vehicle loaded into the canister chamber of the canister and defining a pressure chamber housing an environmentally sealed payload;
an electronic assembly of the air vehicle housed inside of the air vehicle outside of the pressure chamber; and
a signal passthrough system operably engaged with the canister, the air vehicle, and the electronic assembly;
wherein the signal passthrough system is configured to output at least one signal to the electronic assembly external to and remote from the pressure chamber.

2. The system of claim 1, wherein the signal passthrough system is positioned external to the pressure chamber.

3. The system of claim 1, wherein the signal passthrough system comprises:
a backer plate operably engaged with the canister at the second end;
a piston operably engaged with the canister, the backer plate, and the air vehicle, wherein the piston is positioned between the backer plate and the air vehicle; and
a circuit card assembly operably engaged with the backer plate and positioned external to the canister chamber.

4. The system of claim 3, wherein the signal passthrough system further comprises:
a signal path system operably engaged with the backer plate, the piston, the circuit card assembly, and the air vehicle;
wherein the signal path system is configured to output the at least one signal to the electronic assembly through the backer plate, the piston, and the air vehicle external to the pressure chamber.

5. The system of claim 4, wherein the signal path system comprises:
a set of electrical connections operably engaged with the circuit card assembly;
a set of jumper connections operably engaged with the set of electrical connections;
a flex circuit disposed about the air vehicle and connecting with the set of jumper connections; and
a header operably engaged with the flex circuit and the electronic assembly of the air vehicle.

6. The system of claim 5, wherein the air vehicle further comprises:
a body having a first end, a second end longitudinally opposite to the first end, and defining a side aperture at a location between the first end and the second end; and
a set of wing assemblies operably engaged with the body at the second end, wherein each wing assembly of the set of wing assemblies has a base defining a channel therein;
wherein each jumper connection of the set of jumper connections is disposed in a respective wing assembly of the set of wing assemblies remote from the pressure chamber.

7. The system of claim 5, wherein the signal path system further comprises:
a set of piston plungers operably engaged with the piston;
wherein the set of piston plungers interconnects the set of electrical connections and the set of jumper connections with one another.

8. The system of claim 7, wherein each piston plunger of the set of piston plungers comprises:
an input terminal positioned inside of the backer plate and the piston and operably engages with an electrical connection of the set of electrical connections; and
an output terminal positioned inside of a cavity defined in the air vehicle and operably engages with a jumper connection of the set of jumper connections.

9. The system of claim 5, wherein the set of electrical connections further comprise:
a pair of control connections operably engaged with the backer plate and the circuit card assembly; and
a pair of status connections operably engaged with the backer plate.

10. The system of claim 9, wherein the signal path system further comprises:
a pair of circuit card plunger operably engaged with the circuit card assembly;
wherein each circuit card plunger of the pair of circuit card plunger interconnects a dispenser terminal of the circuit card assembly with a control connection of the pair of control connections.

11. A signal passthrough kit operably engaged with a canister housing an air vehicle and an electronic assembly, the signal passthrough kit comprising:
a backer plate operably engaged with the canister;
a piston operably engaged with the canister, the backer plate, and the air vehicle, wherein the piston is positioned between the backer plate and the air vehicle; and
a circuit card assembly operably engaged with the backer plate and positioned external to a canister chamber defined by the canister;
wherein the signal passthrough kit is configured to output at least one signal to the electronic assembly external to a pressure chamber defined in the air vehicle.

12. The signal passthrough kit of claim 11, wherein the signal passthrough kit further comprises:
a signal path system operably engaged with the backer plate, the piston, the circuit card assembly, and the air vehicle;
wherein the signal path system is configured to output at least one signal to the electronic assembly through the backer plate, the piston, and the air vehicle external to the pressure chamber.

13. The signal passthrough kit of claim 12, wherein the signal path system comprises:
a set of electrical connections operably engaged with the circuit card assembly;

a set of jumper connections operably engaged with the set of electrical connections;

a flex circuit disposed about the air vehicle and connecting with the set of jumper connections; and a header operably engaged with the flex circuit and the electronic assembly of the air vehicle.

14. The signal passthrough kit of claim 13, wherein the air vehicle further comprises:

a body having a first end, a second end longitudinally opposite to the first end, and defining a side aperture at a location between the first end and the second end; and a set of wing assemblies operably engaged with the body at the second end, wherein each wing assembly of the set of wing assemblies has a base defining a channel therein;

wherein each jumper connection of the set of jumper connections is disposed in a respective wing assembly of the set of wing assemblies remote from the pressure chamber.

15. The signal passthrough kit of claim 13, wherein the signal path system further comprises:

a set of piston plungers operably engaged with the piston;

wherein the set of piston plungers interconnects the set of electrical connections and the set of jumper connections with one another.

16. The signal passthrough kit of claim 13, wherein the set of electrical connections further comprise:

a pair of control connections operably engaged with the backer plate and the circuit card assembly; and a pair of status connections operably engaged with the backer plate.

17. The signal passthrough kit of claim 16, wherein the signal path system further comprises:

a pair of circuit card plunger operably engaged with the circuit card assembly;

wherein each circuit card plunger of the pair of circuit card plunger interconnects a dispenser terminal of the circuit card assembly with a control connection of the pair of control connections.

18. A method comprising steps of:

installing a backer plate of a signal passthrough kit to a canister, wherein the canister houses an air vehicle and an electronic assembly;

installing a piston of the signal passthrough kit between the backer plate and the air vehicle inside of the canister;

installing a circuit card assembly with the backer plate positioned outside of the canister; and installing a signal path assembly of the signal passthrough kit with the backer plate, the piston, the circuit card assembly, the air vehicle, and the electronic assembly;

wherein the signal path assembly is configured to output at least one signal to the electronic assembly external to a pressure chamber defined in the air vehicle.

19. The method of claim 18, wherein the step of installing the signal path assembly further comprises:

installing a set of electrical connections of the signal path assembly with the circuit card assembly and the backer plate;

installing a set of jumper connections of the signal path assembly with the set of electrical connections;

installing a flex circuit with the set of jumper connections and with the air vehicle, wherein the flex circuit is disposed about an outer surface of a body of the air vehicle; and connecting the flex circuit and the electronic assembly of the air vehicle with a header of the signal path assembly.

20. The method of claim 19, wherein the step of installing the set of jumper connections of the signal path assembly further includes that each jumper connection of the set of jumper connections passes through a channel defined in the body and in a respective wing assembly of a set of wing assemblies of the air vehicle remote from the pressure chamber.

\* \* \* \* \*